United States Patent
He et al.

(10) Patent No.: US 9,449,117 B2
(45) Date of Patent: Sep. 20, 2016

(54) METADATA SEARCH BASED ON SEMANTICS

(71) Applicants: Min He, San Jose, CA (US); David Kung, Cupertino, CA (US); Suryanarayana Mangipudi, San Ramon, CA (US); Hongfan Qian, Fremont, CA (US)

(72) Inventors: Min He, San Jose, CA (US); David Kung, Cupertino, CA (US); Suryanarayana Mangipudi, San Ramon, CA (US); Hongfan Qian, Fremont, CA (US)

(73) Assignee: SAP SE, Walldorf (DE)

( * ) Notice: Subject to any disclaimer, the term of this patent is extended or adjusted under 35 U.S.C. 154(b) by 192 days.

(21) Appl. No.: 14/167,424

(22) Filed: Jan. 29, 2014

(65) Prior Publication Data

US 2015/0213021 A1    Jul. 30, 2015

(51) Int. Cl.
*G06F 17/30* (2006.01)

(52) U.S. Cl.
CPC .............................. *G06F 17/30997* (2013.01)

(58) Field of Classification Search
CPC .................................................. G06F 17/30997
See application file for complete search history.

(56) References Cited

U.S. PATENT DOCUMENTS

| | | | |
|---|---|---|---|
| 7,236,966 B1* | 6/2007 | Jackson | G06F 17/30867 |
| 7,734,566 B2 | 6/2010 | Caracas et al. | |
| 8,527,451 B2 | 9/2013 | Heidasch | |
| 8,595,246 B2 | 11/2013 | Fay et al. | |
| 2008/0281810 A1 | 11/2008 | Smyth et al. | |
| 2010/0106729 A1 | 4/2010 | Pan et al. | |
| 2010/0268702 A1 | 10/2010 | Wissner et al. | |
| 2011/0252065 A1* | 10/2011 | Ryu | G06F 17/30038 707/794 |
| 2011/0264697 A1 | 10/2011 | Latzina et al. | |
| 2012/0005194 A1 | 1/2012 | Partanen et al. | |
| 2012/0047145 A1 | 2/2012 | Heidasch | |
| 2012/0150792 A1 | 6/2012 | Yassin et al. | |
| 2013/0054563 A1 | 2/2013 | Heidasch | |
| 2013/0054564 A1 | 2/2013 | Smyros et al. | |
| 2013/0173547 A1* | 7/2013 | Cline | G06F 17/303 707/638 |
| 2013/0218898 A1* | 8/2013 | Raghavan | G06F 17/30404 707/741 |
| 2013/0282703 A1 | 10/2013 | Puterman-Sobe et al. | |
| 2013/0297617 A1 | 11/2013 | Roy et al. | |
| 2013/0325757 A1 | 12/2013 | Heidasch et al. | |
| 2016/0004720 A1* | 1/2016 | Tabaaloute | G06F 17/30607 707/639 |

\* cited by examiner

*Primary Examiner* — Sherief Badawi
*Assistant Examiner* — Lahcen Ennaji
(74) *Attorney, Agent, or Firm* — Buckley, Maschoff & Talwalkar LLC

(57) ABSTRACT

According to some embodiments, a method and an apparatus of enriching search results with metadata are provided to receive a plurality of metadata associated with an entity and storing the plurality of metadata in a repository. A search request associated with the entity is received and search results that comprise a portion of the plurality of metadata stored in the repository are determined.

12 Claims, 5 Drawing Sheets

300

| ENTITY NAME | ENTITY TYPE | ENTITY RELATIONSHIPS | |
|---|---|---|---|
| | | TARGET ENTITY | RELATIONSHIP TYPE |
| REG_SALES_WEBI.RPT | REPORT | QTR_SALES_REV | LINEAGE |
| | | PRODUCT_SALES | LEVEL 2 LINEAGE |
| | | REGIONAL SALES REPORT | BUSINESS GLOSSARY |
| | | REGION, COUNTRY, YEAR, QUARTER, REVENUE | REPORT FIELDS |
| REVENUE | REPORT FIELD | REV_AMOUNT | LINEAGE |
| | | REG_SALES_WEBI.RPT | PARENT CONTAINER |
| | | REVENUE, QUATERLY REVENUE, YEARLY REVENUE | BUSINESS GLOSSARY |
| REV_AMOUNT | DATABASE COLUMN | REVENUE | IMPACT |
| | | REG_SALES_WEBI.RPT | IMPACT |
| | | REVENUE | BUSINESS GLOSSARY |
| | | QTR_SALES_REV | PARENT CONTAINER |
| | | PRODUCT_SALES.REV_AMOUNT | LINEAGE |
| QTR_SALES_REV | DATABASE TABLE | REG_SALES_WEBI.RPT | IMPACT |
| | | ... | ... |

METADATA SEARCH BASED ON SEMANTICS

BACKGROUND

Traditional search mechanisms are based on keyword matching by creating indexes on various text elements. Thus, a user can only perform searches based on keywords that match data elements contained in an index. For example a user may search for "Quarterly Revenue".

In a conventional index based search, a search engine will index data elements and only those elements which have the words "Quarterly", "Revenue", or any combinations of the above will show up on the search result. This approach doesn't consider the fact that in technical systems an element name may be different than a business terminology. In other words, the corresponding database table that stores the "Quarterly Revenue" may be called "QTR_SALES_REV" and thus in a conventional index based search, the database table QTR_SALES_REV that stored the "Quarterly Revenue" will not be returned.

Therefore, it is desirable to have a system and method to expand a conventional index based search to return greater amounts of relevant data.

BRIEF DESCRIPTION OF THE DRAWINGS

FIG. 3 illustrates a repository according to some embodiments.

DETAILED DESCRIPTION

The present embodiments relate to a method, apparatus and system to enrich searches with metadata from a metadata repository. Metadata may comprise data that characterizes other data and may exist in many different places within an enterprise. Metadata may comprise metadata semantics. The term "metadata semantic" may be defined as inherent rules and metadata relationships. The term "metadata relationship" may be defined as the relationships between metadata objects which can be explicit or implicitly derived from a system. Metadata semantics may be added to search indexes and thus, a search may be performed on not only keyword matching but also on following a plurality of metadata paths (e.g., a graph) of object relationships to reach as many relevant objects as possible. Each object in the path may be scored and the score for each object may determine an object's relevance (e.g., a relevance of the object to be included in search results). The score may be based on keyword matching, object relationships and the relationship depth in the path.

For example, employees' tax identities may be stored in multiple places in a database and may be used for multiple purposes under different names like SSN (social security number in US), SIN (social insurance number in Canada), TAX_ID, etc. For auditing purposes, a user may desire to discover each field where tax identities are stored, and what impact might occur if a change is made to these fields. If a search is performed based on only keyword matching, the user will need to investigate which database tables or views store tax identities by searching different keywords like SSN, SIN and TAX_ID, and then manually trace those keywords to other metadata like reports and business terms that have relationships with these tables and views and would be impacted by a change to the searched fields. The present embodiments, using enriched searches with metadata semantics, may perform a single search (e.g., the term "tax identity") and the search result may contain all relevant database tables, views, reports and business terms that comprise a high enough relevance score to be included in search results where the relevance score is based on types of objects, relationships, and their depth.

Figure 1:
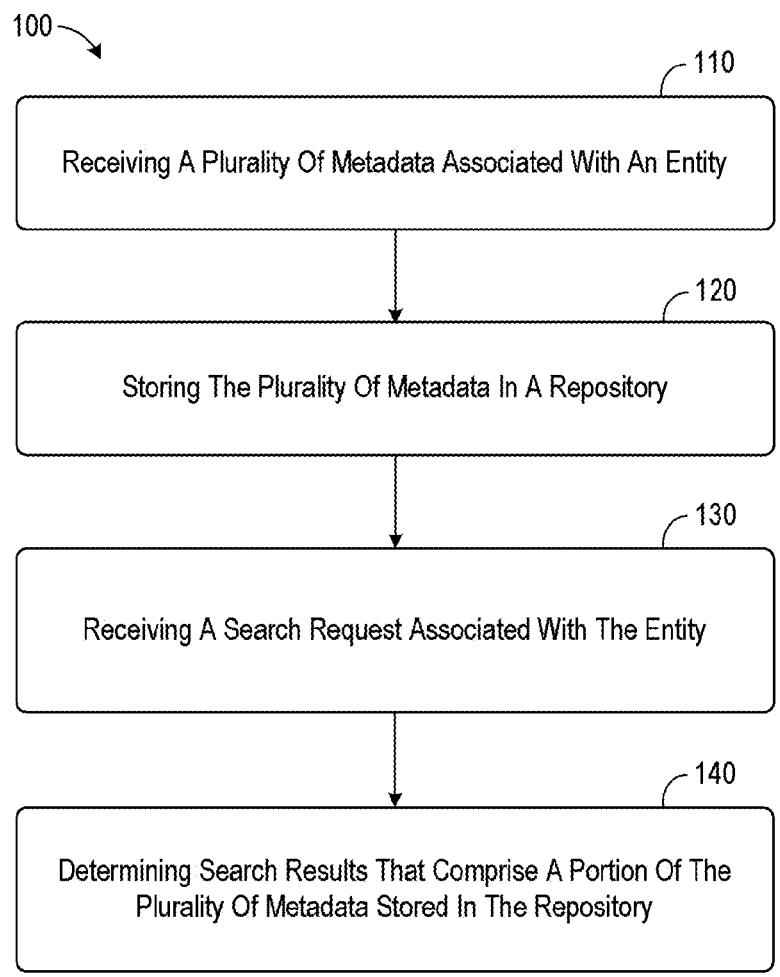
FIG. 1 illustrates a method according to some embodiments.

Turning now in detail to the drawings, FIG. 1 is a flow chart that illustrates a method 100 that may be performed according to some embodiments. The flow chart in FIG. 1 does not imply a fixed order to the steps, and embodiments of the present invention can be practiced in any order that is practicable. Moreover, the methods may be performed by any of the devices described herein. The method shown in FIG. 1 may be performed, for example, by the system 200 of FIG. 2 and the apparatus 400 FIG. 4. The method 100 may be embodied on a non-transitory computer-readable medium.

At 110, a plurality of metadata associated with an entity is received. The plurality of metadata may be transmitted by a metadata engine, such as, but not limited to SAP's Metadata Management module in SAP Information Steward.

For illustrative purposes, and to aid in understanding features of the specification, an example will be introduced. This example is not intended to limit the scope of the claims.

Figure 2:
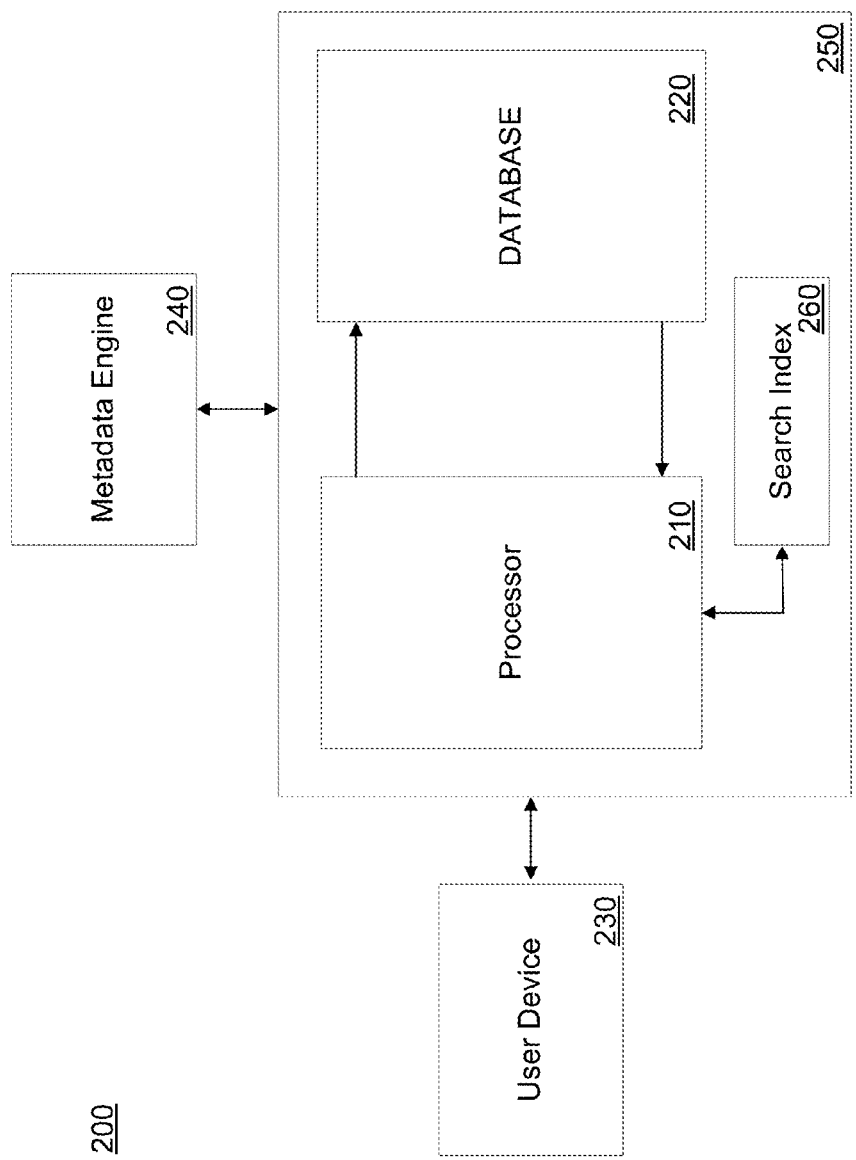
FIG. 2 illustrates a system according to some embodiments.

Now referring to FIG. 2, an embodiment of a system 200 is illustrated. System 200 may comprise a metadata engine 240 and a user device 230 in communication with a server 250. The metadata engine 240 transmits collected metadata to the server 250. In the present example, the metadata engine 240 may have collected a plurality of metadata semantics associated with a system such as database or business application (not shown).

Referring back to FIG. 1, at 120, the plurality of metadata is stored in a repository. A repository may comprise a relational database, a flat file, an in-memory database, etc. The metadata engine may consolidate metadata from various data sources and store the metadata into a central repository for metadata management. Thus, the repository may include metadata from various data sources. Continuing with the above example, the metadata engine may consolidate metadata from a database system or business application and transmit that data to the server 250 where the plurality of metadata is stored in a repository, such as, database 220. In some embodiments, the server 250 may comprise the metadata engine 240. A search index 260 is built by the metadata engine which is comprised of metadata in the database 220. The search index 260 is used by the processor 210 for returning metadata search result to the user device.

A search request associated with a data object (e.g., an entity) is received at 130, referring back to FIG. 1. Continuing with the above example, a search request for the term "Quarterly Revenue" may be received from the user device 230. The search request may be received at the server 250. A search request may contain one or more keywords for a metadata search.

At 140, search results that comprise a portion of the plurality of metadata stored in the repository are determined. The determination may be based on a search index that has been enhanced with metadata semantics. In the present embodiments, a search index may be enriched and augmented with metadata semantics, metadata relationships and business glossary terms. In some embodiments, semantic knowledge may be added to a search index process or, in other words, each search index may be (1) augmented with consolidated metadata which includes definition of that element in various contexts such as how that element is defined in various enterprise systems, (2) augmented with metadata associated with a parent or child of each entity contained in the search index, (3) augmented with various relationships, which are discovered through metadata analysis along with other objects in the enterprise systems (4) provided with a relationship distance based on object weighting to determine an relevance of an object in a given context.

Now referring to FIG. 3, an embodiment of a repository 300 is illustrated. The repository 300 may illustrate an example of data entities that may be stored in a repository 300. The repository 300, illustrated as a table, may list metadata objects which are related to a respective data entity. The repository 300 defines fields 310, 320, 330 and 340. Field 310 relates to a data entity name and field 320 relates to an entity type for an associated entity name. For example, and as illustrated in repository 300, an entity name may be REG_SALES_WEBI.RPT which has an entity type of report. Other examples illustrated in the repository 300 comprise an entity name of REVENUE which is a type of report field, REV_AMOUNT which is a type database column, and QTR_SALES_REV which is a type database table.

Field 330 may relate to one or more target entities which comprise metadata objects associated with a respective data entity as listed in field 310. For example, a data entity REG_SALES_WEBI.RPT is related to metadata objects such as QTR_SALES_REV, PRODUCT_SALES, REGIONAL SALES REPORT, REGION, COUNTRY, YEAR, QUARTER, REVENUE, SALES by a relationship type which is contained in field 340. As illustrated, QTR_SALES_REV may be related to REG_SALES_WEBI.RPT through lineage relationship, PRODUCT_SALES is related to REG_SALES_WEBI.RPT through 2 levels of lineage relationship, REGIONAL SALES REPORT is business glossary definition associated with REG_SALES_WEBI.RPT, and REGION, COUNTRY, YEAR, QUARTER, REVENUE are each type report field.

The term "business glossary" may be defined as business terms, terminology and concepts that are defined by a business user. Typically, a business user or a data steward may create a business glossary and associate terms in the glossary to various metadata entities to convey the meanings, relationships and other aspects. The terms "impact" and "lineage" may be defined as a relationship between a source and target entity. The target entity may be affected when a change is made to the source entity. For example, if it is known that a first object impacts a second object (Obj1->Obj2), then Obj1 has an impact relationship to Obj2, while Obj2 has lineage relationship to Obj1. There may be many levels of impact and lineage relationship between two objects. In the case of Obj1->Obj2->Obj3, Obj3 has a "level 2 lineage" relationship to Obj1. It's also possible that the objects in the relationships may reside in separate systems.

Continuing with the above example, a search request for "Quarterly Revenue" may be received at a processor, such as processor 210, the processor examines all the search indexes and finds the REG_SALES_WEBI.RPT report because the search index contains a report fields relationship to QUARTER and REVENUE. Based on the lineage relationship between REVENUE report field and REV_AMOUNT column, and parent container relationship between REV_AMOUNT column and QTR_SALES_REV table, the QTR_SALES_REV table is returned in the search. The search may also return various other elements from the repository 300 that relate to the REG_SALES_WEBI.RPT such as report fields, business glossary definitions, other entities contained in a parent container/folder, other entities that would be impacted (e.g., type impact) from the user device 230. The search request may be received at the server 250.

A semantic and relationship enriched search may find the report field "REVENUE" by simple keyword matching, and a processor may expand the search results along the semantics and relationships described in the repository 300 to find the related metadata objects such as the database column REV_AMOUNT, the report REG_SALES_WEB.RPT, and the table "QTR_SALES_REV". After that, the search may continue based on object relationships and finds a list of business terms. Finally the processor may combine all these different objects, and sorts them based on the relevance score.

The relevance score may be defined as follows:

A search (e.g., a query q) in a document d, which means metadata, may be scored using the following formula:

$$\text{score}(q, d) = \sum_{t \text{ in } q} \left( tf(t \text{ in } d)^{1/2} \cdot idf(t)^2 \cdot * \left( \sum_{p \text{ in parents}} relationshipf(t, d) * \text{depth}(n^{th}) * \text{score}(p) \right) \right)$$

TF may comprise a frequency of the term t. IDF may comprise inverse document frequency. The score of query q for document d may be calculated on TF-IDF, relationship frequency, depth of an object in a relationship graph, and its related parent objects. TF-IDF may comprise a numerical statistic which may reflect how important a word is to a document in a collection. Relationship frequency may comprise another measurement that describes how many hidden relationships exist in a related (indirect) object.

tf(t in d) may relate to a frequency of a term t_in a document d. In order to avoid bias to large documents tf(t in d) may be normalized to (Frequency of a term t in a document d/total number of terms in a document)$^{1/2}$.

idf(t, D) may relate to term t's inverse document frequency that is based on number of documents containing the term within a collection of document D. It may be calculated as (1 +LOG (numDocs/(docFreq+1))) where numDocs is the total number of the documents and docFreq is the number of documents containing the term.

relationshipf (t in d) may relate to a relationship of a document. It may be based on a relationship found related to the document d given by a term t within a collection of relationships of document D. The formula is 1+LOG (relationshipWeight*numberOccurs/(totalRelationshipsWeight+1)) where relationship Weight is the weight of a relationship type, and totalRelationshipsWeight is the sum of number of relationships weight to the document.

depth($n^{th}$) may relate to the level of depth of the object to the top object.

Figure 5:
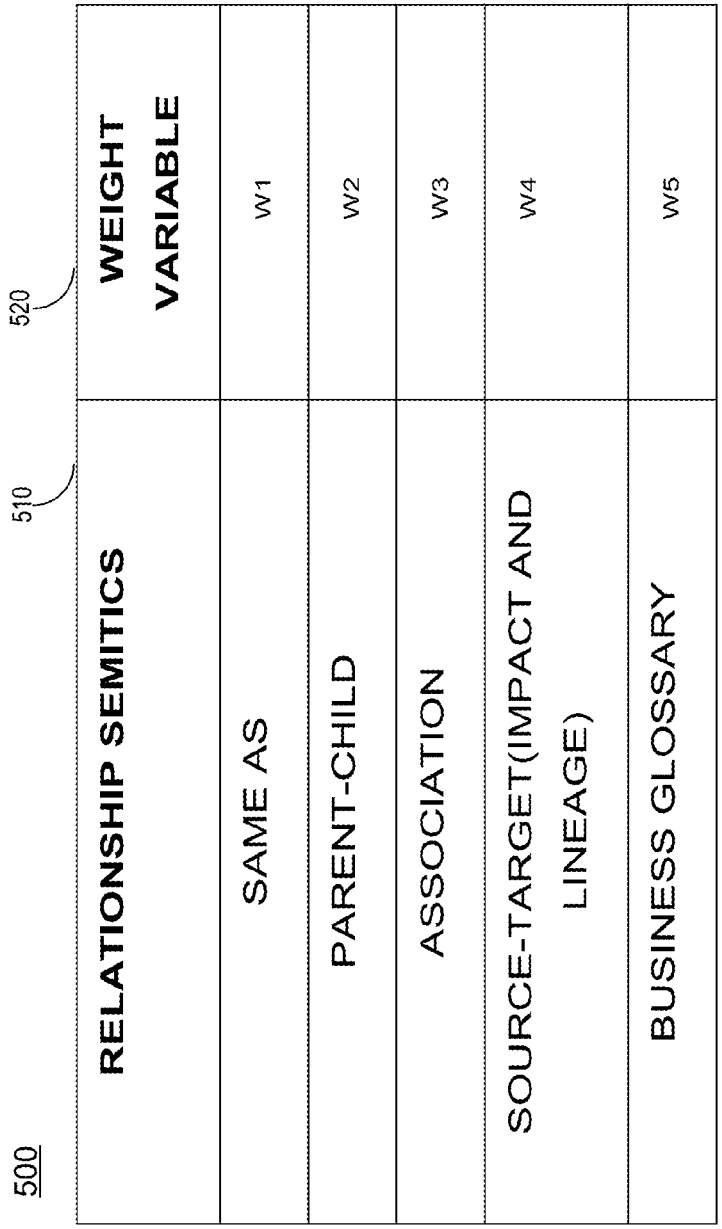
FIG. 5 illustrates a weight table according to some embodiments.

Since metadata objects may come from various data sources, the types of relationships between them may be different. The term relationship Weight is denoted as the weight of a type of relationship used in the score calculation. FIG. 5 illustrates a weight table 500 according to some embodiments. FIG. 5 defines fields 510 and 520. Field 510 relates to a type of relationship and field 520 relates to a weight given to a respective relationship.

A relationship type of "same as" may relate to two objects that are the same by looking at rules to determine that, even if they have different names, the two objects are the same. A relationship type of "parent-child" may relate to a parent-child relationship of objects such that a parent may have multiple children but a child may only have a single parent. A relationship type of "association" may relate to objects that have some association with each other but to not have a parent-child relationship. For example, two objects may work in conjunction with each other or may comprise a friendship relationship (e.g., social networks). A relationship type of "source-target may relate to two objects where one is a source and the other object is a target of the source object. A relationship type of "business glossary" may relate to business names or user defined relationships.

Some factors used for scoring comprise the following:

tf(t in d) (Frequency of a term t_in a document d/total number of terms in a document)$^{1/2}$ idf(t) 1+LOG (numDocs/(docFreq+1))

relationshipf(t,d) 1+LOG (relationshipWeight*numberOccurs/( totalRelationshipsWeight+1))

numDocs The number of all documents numberOccurs The number of relationship of this kind to this object totalRelationshipsWeight The total weight of relationships to this object docFreq The number of document which has the term depth($n^{th}$) 1/the number of the depth to this object score(p) The score of parent As described above, for a given metadata entity, a search using metadata combines search indexes from keyword matching and metadata semantic matching. Metadata semantics may be derived from metadata relationships. An enhanced search index (e.g., keywords as well as metadata) may be based on a metadata object's name, description and other attributes. The enhanced search index may comprise metadata semantics and relationships and business terms and thus the search index may be based on relationships which are linked to other related objects. For each type of relationship, the weight used in the score calculation can be different and configurable. Search results may be limited to an arbitrary number (e.g., 10) and the search results may then be transmitted to a user device.

Figure 4:
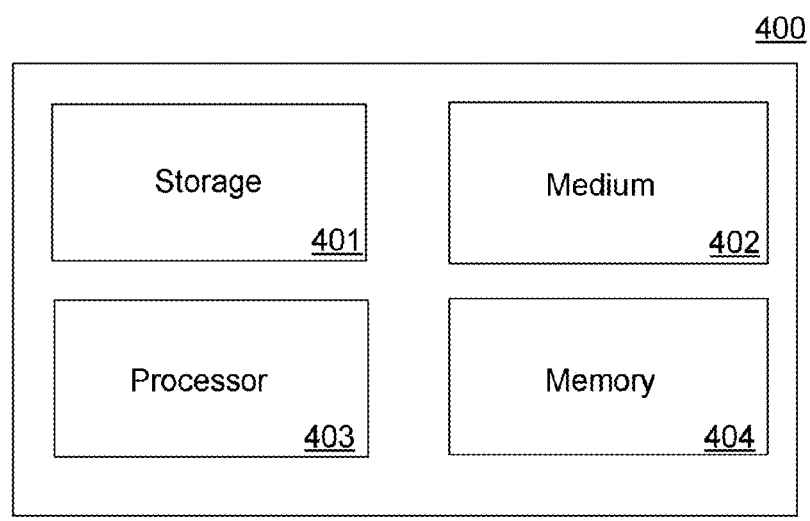
FIG. 4 illustrates an apparatus according to some embodiments.

Now referring to FIG. 4, an embodiment of an apparatus 400 is illustrated. In some embodiments, the apparatus 400 may be associated with a server that receives a search request such as server 200.

The apparatus 400 may comprise a storage device 401, a medium 402, a processor 403, and a memory 404. According to some embodiments, the apparatus 400 may further comprise a digital display port, such as a port adapted to be coupled to a digital computer monitor, television, portable display screen, or the like.

The medium 402 may comprise any computer-readable medium that may store processor-executable instructions to be executed by the processor 403. For example, the medium 402 may comprise a non-transitory tangible medium such as, but not limited to, a compact disk, a digital video disk, flash memory, optical storage, random access memory, read only memory, or magnetic media.

A program may be stored on the medium 402 in a compressed, uncompiled and/or encrypted format. The program may furthermore include other program elements, such as an operating system, a database management system, and/or device drivers used by the processor 403 to interface with peripheral devices.

The processor 403 may include or otherwise be associated with dedicated registers, stacks, queues, etc. that are used to execute program code and/or one or more of these elements may be shared there between. In some embodiments, the processor 403 may comprise an integrated circuit. In some embodiments, the processor 403 may comprise circuitry to perform a method such as, but not limited to, the method described with respect to FIG. 1.

The processor 403 communicates with the storage device 401. The storage device 401 may comprise any appropriate information storage device, including combinations of magnetic storage devices (e.g., a hard disk drive), optical storage devices, flash drives, and/or semiconductor memory devices. The storage device 401 stores a program for controlling the processor 403. The processor 403 performs instructions of the program, and thereby operates in accordance with any of the embodiments described herein.

The main memory 404 may comprise any type of memory for storing data, such as, but not limited to, a flash driver, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 404 may comprise a plurality of memory modules.

As used herein, information may be "received" by or "transmitted" to, for example: (i) the apparatus 400 from another device; or (ii) a software application or module within the apparatus 400 from another software application, module, or any other source.

In some embodiments, the storage device 401 stores a database (e.g., including information associated with metadata semantics and metadata relationships). Note that the database described herein is only an example, and additional and/or different information may be stored therein. Moreover, various databases might be split or combined in accordance with any of the embodiments described herein. In some embodiments, an external database may be used.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method to enrich search results with metadata, the method comprising:

receiving a plurality of metadata based on a lineage relationship and an impact relationship associated with an entity;

storing the plurality of metadata in a repository;

receiving a search request associated with the entity; and determining search results that comprise a portion of the plurality of metadata stored in the repository, where the portion of the plurality of metadata that is transmitted is based on a score calculation associated with score $$(q, d) = \sum_{t\ in\ q} \left( tf(t\ in\ d)^{1/2} \cdot idf(t)^2 \cdot * \left( \sum_{p\ in\ parents} relationshipf(t, d) * \mathrm{depth}(n^{th}) * \mathrm{score}(p) \right) \right)$$

wherein t is a term, q is a query, tf is a frequency of the term t, d is a document, depth ($n^{th}$) is a level of depth of an object to a top object, p is a parent, relationshipf(t,d) is a relationship of the document, and idf is an inverse document frequency of the term.

2. The method of claim 1, wherein the plurality of metadata are received from a metadata engine.

3. The method of claim 1, wherein the plurality of metadata comprise entities such as a report, a report field, a database column, and a database table.

4. A non-transitory computer-readable medium comprising instructions that when executed by a processor perform a method to enrich search results with metadata, the method comprising:
   receiving a plurality of metadata based on a lineage relationship and an impact relationship associated with an entity;
   storing the plurality of metadata in a repository;
   receiving a search request associated with the entity; and
   determining search results that comprise a portion of the plurality of metadata stored in the repository, where the portion of the plurality of metadata that is transmitted is based on a score calculation associated with score $$(q, d) = \sum_{t \text{ in } q} \left( tf(t \text{ in } d)^{1/2} \cdot idf(t)^2 \cdot * \left( \sum_{p \text{ in parents}} relationshipf(t, d) * \text{depth}(n^{th}) * \text{score}(p) \right) \right)$$

wherein t is a term, q is a query, tf is a frequency of the term t, d is a document, depth ($n^{th}$) is a level of depth of an object to a top object, p is a parent, relationshipf(t,d) is a relationship of the document, and idf is an inverse document frequency of the term.

5. The non-transitory computer-readable medium of claim 4, wherein the plurality of metadata are received via a metadata engine.

6. The non-transitory computer-readable medium of claim 4, wherein the plurality of metadata comprise entities such as a report, a report field, a database column, and a database table.

7. An apparatus comprising:
   a processor; and
   a non-transitory computer-readable medium comprising instructions that when executed by a processor perform a method to enrich search results with metadata, the method comprising:
   receiving a plurality of metadata based on a lineage relationship and an impact relationship associated with an entity;
   storing the plurality of metadata in a repository;
   receiving a search request associated with the entity; and
   determining search results that comprise a portion of the plurality of metadata stored in the repository, where the portion of the plurality of metadata that is transmitted is based on a score calculation associated with score $$(q, d) = \sum_{t \text{ in } q} \left( tf(t \text{ in } d)^{1/2} \cdot idf(t)^2 \cdot * \left( \sum_{p \text{ in parents}} relationshipf(t, d) * \text{depth}(n^{th}) * \text{score}(p) \right) \right)$$

wherein t is a term, q is a query, tf is a frequency of the term t, d is a document, depth ($n^{th}$) is a level of depth of an object to a top object, p is a parent, relationshipf(t,d) is a relationship of the document, and idf is an inverse document frequency of the term.

8. The apparatus of claim 7, wherein the plurality of metadata comprise entities such as a report, a report field, a database column, and a database table.

9. The method of claim 1, wherein the entity is a target entity and the metadata is associated with the entity being affected when a change is made to a source entity.

10. The method of claim 9, wherein the target entity resides in a first system and the source entity resides in a second system.

11. The method of claim 1, wherein the entity is a source entity and the metadata is associated with a change to the entity that affects a target entity.

12. The method of claim 11, wherein the target entity resides in a first system and the source entity resides in a second system.

* * * * *